United States Patent [19]

Asselanis et al.

[11] Patent Number: 4,759,823

[45] Date of Patent: Jul. 26, 1988

[54] METHOD FOR PATTERNING PLZT THIN FILMS

[75] Inventors: Dino Asselanis, Rio Rancho; Sylvia D. Mancha, Albuquerque, both of N. Mex.

[73] Assignee: Krysalis Corporation, Albuquerque, N. Mex.

[21] Appl. No.: 57,099

[22] Filed: Jun. 2, 1987

[51] Int. Cl.$^4$ ............ B44C 1/22; C03C 15/00; C03C 25/06; C23F 1/02
[52] U.S. Cl. .................... 156/659.1; 134/3; 156/638; 156/650; 156/655; 156/663; 156/667; 252/79.3; 430/313
[58] Field of Search ............ 156/638, 655–656, 156/650, 659.1, 662, 663, 667; 252/79.2, 79.3–79.4; 134/3, 41; 430/313, 318

[56] References Cited

U.S. PATENT DOCUMENTS

| 3,124,478 | 3/1964 | Cirkler et al. | 117/200 |
| 3,917,780 | 11/1975 | Mazdiyasni et al. | 264/61 |
| 3,923,675 | 12/1975 | Mazdiyasni et al. | 252/62.9 |
| 4,477,401 | 10/1984 | Hagemann et al. | 264/61 |

OTHER PUBLICATIONS

"Sol-Gel Processing of PbTiO$_3$, PbZrO$_3$, PZT, PLZT Thin Films", K. D. Budd et al., Brit. Cer. Proc., vol. 36 (1985), pp. 107–121.

"Preparation of Ferroelectric Compounds", J. Fukushima et al., Journal of Materials Science, 19 (1984), pp. 595–598.

"Crystallization and Transformation of Distorted Cubic BPBTIO$_3$", O. Yamaguchi et al., J. Am. Ceram., Soc. 69 [10] C-256-C-257 (1986).

"Ferroelectric Arrays: Competition for Core and Semiconductor Memories", Digital Design, Jun. 1973, pp. 30–32.

"Structure Evolution in Sol–Gel Derived Lead Titanate-Base Materials and Application to the Processing of Thin Dioelectric Layers", thesis by K. D. Budd, 1986.

Primary Examiner—William A. Powell
Attorney, Agent, or Firm—Richards, Harris, Medlock & Andrews

[57] ABSTRACT

A method for etching thin films of compostions from the PLZT family which have been deposited on substrates. The film is coated with a photosensitive material which is developed by photolithographic techniques to form a photoresist mask upon the film layer, the photoresist material having a predetermined pattern. The thin film coated substrate with the developed photoresist mask is immersed in a dilute etching solution containing hydrochloric acid and fluorine ion donor for a period of time sufficient to etch that portion of the thin film layer not covered with the developed photoresist, removing the thin film coated substrate after it has been etched, rinsing the substrate and then immersing the substrate in a second etching solution containing a dilute solution of a lead solubilizing medium such as nitric acid, or acetic for a period of time sufficient to remove lead residue remaining from the first etching step. The resulting product is a thin film coated substrate having the desired pattern of thin film in a predetermined configuration for use in an integrated circuit.

25 Claims, No Drawings

METHOD FOR PATTERNING PLZT THIN FILMS

TECHNICAL FIELD

The present invention relates to patterning processes and in particular an etching process suitable for the etching and patterning of thin films from the PLZT family of compositions which have been applied to substrates for applications including semiconductors and optics.

BACKGROUND OF THE INVENTION

For many years it has been postulated that ferroelectric materials, i.e., materials that exhibit characteristics similar to ferro magnetic materials, would be competitive with magnetic core and semiconductor memories. This has been suggested in an article "Ferroelectric Arrays: Competition For Core and Semiconductor Memories", beginning on page 30 of *Digitial Design* in the June 1973 issue. Ferroelectric materials, however, have not become commercially successful for use in semiconductors for a variety of reasons, principally because a good quality thin film could not be applied to a substrate and fabricated into circuits.

A recent development, which shows some promise as a ferroelectric material, is the PLZT family, which is an abbreviation for a ceramic oxide composition containing lead, lanthanum, titanium and zirconium. The phrase "PLZT family" as used herein refers to various compositions of PLZT or combinations of two or more of the components, such as PZT (no lanthanum present), PLT (no zirconium present) PZ (no lanthanum or titanium present) and PT (no lanthanum or zirconium present). While the theoretical suitability of PLZT family materials as memory elements has been known for some time, practical applications of the material in the form of a thin film on a silicon wafer or other substrates has evaded the art. The formation of such a suitable thin PLZT film is the subject of a copending application Ser. No. 057,323 filed concurrently herewith. Although that application describes a suitable process for deposition of the thin PLZT film, it was found that conventional etching procedures, as used in the manufacture of semiconductor integrated circuits, cannot produce a patterned PLZT which is successful as an element of an integrated circuit.

Prior attempts at a wet process etching for PLZT family materials were disclosed in relation to large blocks or layers of material. There has not been a wet etching process suitable for etching PLZT family films which allowed for production of a well defined pattern of the size suitable for MOS applications. Typically, the film patterns are less than 2000 square microns in size and tolerances for various leads are generally one micron or less, thus the etching process must be controllable. Limited work has been done to pattern PLZT family thin films using reactive ion etching (RIE). However, RIE patterning requires complex and expensive equipment. The added expense of RIE processing can make the economical production of integrated circuits impossible. Prior wet process etching attempts to pattern PLZT family materials were not suitable for producing a well defined pattern with the required electronic or photosensitive properties.

The present invention provides an economical, simple and effective wet etching process for patterning PLZT family thin films. This allows the PLZT family of materials to be economically utilized in microcircuit technology.

SUMMARY OF THE INVENTION

The present invention provides for the patterning of PLZT family films by the wet process etching of PLZT family layers applied to suitable substrates such as silicon wafers known in the semiconductor industry. The PLZT family includes PLZT, PZT, PZ, and PT films of compositions in various ratios. The thin film from the PLZT family can be applied to a suitable substrate by any method and preferably by forming a sol-gel with the desired composition from the PLZT family. A sol-gel thin film is then formed on a substrate by spin coating techniques. Thereafter, the thin film can be sintered to form the thin film of PLZT ceramic. The invention allows for etching an unsintered film, sintered film or etching the film both before and after sintering. The ceramic can be etched by the method of the present invention.

The method, in one aspect, provides for the patterning of sintered PLZT family thin films. A photoresist layer is applied to a sintered PLZT family thin film which has been fabricated on a substrate. The photoresist layer is processed by conventional photolithographic processing to produce a photoresist mask. The photoresist mask thus formed functions to protect the PLZT family thin film underneath the patterned photoresist during the etching process. The sintered PLZT family coated substrate, with the patterned photoresist coating defining the desired circuit elements is preferably placed in an aqueous etching solution containing hydrochloric acid and fluorine ion donor of a concentration sufficient to etch that portion of the sintered PLZT layer not covered with the patterned photoresist layer in from 2 to 15 seconds. This etching removes substantially all of the exposed PLZT family film without significant undercutting. After the initial etching step is completed, the sintered PLZT family coated substrate is removed from the initial etching bath, rinsed, and placed in a dilute lead solubilizing solution, such as nitric acid, for a sufficient period of time to remove the residue remaining after the initial etching step. Thereafter, the substrate is removed from the second etching solution and rinsed with deionized water, and next, the remaining photoresist is removed from the sintered PLZT family thin film by use of a conventional photoresist stripper, resulting in the final patterned sintered PLZT family film.

The hydrochloric acid and fluorine ion donor etching solution can be made a variety of ways such as:

|  | Solution #1 | Solution #2 |
| --- | --- | --- |
| $H_2O$ | 6.2% to 99.4% | 62% to 99% |
| HCl | .35% to 35% | 0.35% to 35% |
| HF | 0.02% to 11.5% | 0 |
| $NH_4F$ | 0 | 0.03% to 14% |

Preferably a mixture HF and $NH_4F$ is used as the fluoride ion donor and the following compositions can be used:

|  | Preferred | More Preferred | Most Preferred |
| --- | --- | --- | --- |
| $H_2O$ | 62% to 99.4% | 69% to 85% | 68.5% to 85% |
| HCl | 0.35% to 35% | 11.5% to 29.5% | 11.6% to 27% |
| HF | 0.01% to 2.2% | 0.33% to 1.3% | 0.4% to 1.3% |

|  | Preferred | More Preferred | Most Preferred |
| --- | --- | --- | --- |
| NH4F | 0.02% to 9.3% | 1.4% to 5.6% | 2.0% to 5.6% |

In the most preferred method, the sintered PLZT family coated substrate, with the patterned photoresist coating in place, is placed in an aqueous solution of hydrochloric acid and fluorine ion donor, such that water is present in an amount from about 45% to 99%. The preferred solution is made by adding about 50% to about 75% water by volume and the remainder is made up of a 70% hydrochloric acid solution, and the fluorine ion donor is a buffered hydrofluoric acid solution of 7.8% HF, 33.6% NH4F, and 58.6% water, in a ratio of said hydrochloric acid solution to said hydrofluoric acid solution in the range of from about 1:1 to about 10:1 preferably about 2:1 to 5:1. Thus, the solution made of 50 parts water and 25 parts of 70% HCl and 25% of the buffered hydrofluoric acid at 1:1 would result in the following composition:

|  | WATER | HCl | HF | NH4F |
| --- | --- | --- | --- | --- |
| 50 parts water | 50 | — | — | — |
| 25 parts 70% HCl | 7.5 | 17.5 | — | — |
| 25 parts buffered HF | 14.65 | — | 1.95 | 8.4 |
| TOTALS | 72.15 | 17.5 | 1.95 | 8.40 |

Thus, the preferred solution range are from about 72 to about 86% H2O; about 8.7 to about 32% HCl; about 0.18 to about 2% HF and about 0.7 to about 8.5% NH4F.

All percentages and ratios herein are based on volume unless otherwise specified. The substrate is left in the initial etching bath for a period of time sufficient to dissolve substantially all of the sintered PLZT family layer not protected by the photoresist, without significant undercutting of the sintered PLZT family layer protected by the photoresist. Etching should be accomplished in 2 to 15 seconds. The substrate is next removed from the initial etching bath and then rinsed with deionized water. Following the rinse, the substrate is placed in a second etching bath containing a lead solubilizing solution, preferably a dilute nitric acid solution. Thereafter, the substrate is removed from the second etching bath, rinsed, and the photoresist layer is removed with a suitable photoresist stripper. The substrate with the desired sintered PLZT family film pattern thereon can then be processed for semiconductor use.

In another aspect, the present invention relates to etching of a unsintered film from the PLZT family. After the unsintered film has been etched, the resulting unsintered film is then sintered and the sintered film may then be etched, as described above, if needed. In this embodiment, the invention relates to etching of an unsintered film which has preferably been formed by creating a sol-gel of the desired composition from the PLZT family, applied to a substrate and baked at low temperatures to drive off solvents but not high enough to sinter the PLZT family film. The baked sol-gel film is then coated with a photoresist material which is then masked with the desired pattern, then processed to develop the desired pattern, followed by the etch of the present invention. The etching solution is made up of 30 to 70 parts by volume of water, preferably deionized or distilled, with one part of a solution of 70% hydrochloric solution and BOE hydrofluoric acid solution. As used herein, "BOE hydrofluoric acid" refers to a buffered hydrofluoric acid of approximately 58.6% water, 7.8% HF, and 33.6% NH4F. The 70% hydrochloric acid and the BOE hydrofluoric acid solution being present in a ratio of from 1:1 to about 10:1, preferably in the ratio of from about 2:1 to about 5:1. The substrate is left in the initial etching bath for a period of time sufficient to dissolve substantially all of the thin film of the PLZT family which has not been covered with the photoresist material and such that significant undercutting of the unsintered PLZT family layer protected by the photoresist is not caused. The substrate is then removed from the initial etching bath and rinsed with water, preferably deionized or distilled. Following the rinse, the substrate may then be placed in a second etching bath. The second etching bath serves to remove the residue that is normally left by the first etching step. The substrate is placed in ## film all the elements present. To be useful in semiconductors or optics, a thin film of a composition from the PLZT family which has been applied to a substrate must be patterned to form the desired circuit elements. The present invention provides a method for patterning a PLZT family film ceramic which results in the formation of PLZT family circuit elements that have excellent ferroelectric properties. The invention is useful with any PLZT family composition.

Semiconductor integrated circuits are typically fabricated using planar processes. Such processing involves the definition of dopants into selected regions of a silicon substrate followed by the formation, through deposition or other processes, of various layers which are then etched to form patterned elements. The deposited layers include conductive metals, insulators and passivating materials. Each layer is patterned by use of a separate mask which is used in conjunction with standard photolithographic techniques involving photoresist mask materials and strippers. In the formation of an integrated circuit using the PLZT family material, this material is deposited as one of the layers in the manufacturing process. However, successful patterning requires the process described herein rather than those conventionally used with other insulating and conducting layers which form a part of the integrated circuit.

A method and composition for achieving a suitable PLZT family layer upon a substrate for use in microelectronics is disclosed in copending application filed concurrently herewith Ser. No. 057,323. The method disclosed therein relates to the use of sol-gel technique to deposit a film having a composition from the PLZT family on a substrate.

SOL-GEL APPLICATION OF FILM

The PLZT family film can be deposited by the following method for producing films containing lead and one or more of the following: titanium, zirconium and lanthanum. Most commonly these are PLZT, PZT and PLT thin films. This is done by preparing a sol-gel of predetermined composition and applying it to substrates using spin coating techniques known in the semiconductor industry, such as described in *Semiconductor & Integrated Circuit Fabrication Techniques,* 1979, Reston Publishing Company Inc. pps. 105–107. PLZT is an abbreviation for lanthanum doped lead zirconate titanate, a ferroelectric material in the crystalline form. PZT is an abbreviation for lead zirconate titanate, a ferroelectric material in the crystalline form. PLT is an abbreviation for lanthanum doped lead titanate. The stoichiometry of these films can vary. The stoichiometry of any particular PLZT, PZT or PLT composition is expressed by the "lanthanum/zirconium/titanium" content in the resulting solid, solution. For example $Pb_{1-L/100}La_{L/100}(Zr_{Z/100}Ti_{T/100})O_3$ PLZT family compositions with the following stoichiometry have been prepared: 3/70/30 (PLZT); 3/60/40 (PLZT); 0/50/50 (PZT), 3/50/50 (PLZT); 3/40/60 (PLZT); 6/40/60 (PLZT); 8/40/60 (PLZT); 10/40/60 (PLZT); 0/60/40 (PZT) 8/0/100 (PLT); 15/0/100 (PLT) and 0/53/47 (PZT). The above expression is based on percentages by mole ratios. The expression L/Z/T, as in 3/70/30 (for example), is shorthand for expressing %Pb+%La=100=%Zr+%Ti where percentage is based on atomic percent or mole ratios of atoms. A 3/70/30 (PLZT) is 97 atoms Pb and 3 atoms La to 70 atoms Zr and 30 atoms Ti (or 97 atomic % Pb and 3 atomic % La to 70 atomic % Zr and 30 atomic % Ti). A 0/53/47 (PZT) is 100 atoms Pb and 0 (zero) atoms La to 53 atoms Zr and 47 atoms Ti. An 8/0/100 (PLT) is 92 atoms Pb and 8 atoms La to 0 (zero) atoms Zr and 100 atoms Ti.

(P+L):(Z+T)=100:100 or
(P+L)=100=(Z+T) or
(P+L)+(Z+T)=200

The general chemical formula for PLZT family compositions (which can include PZT and PLT) is:

$Pb_{1-L/100}La_{L/100}(Zr_{Z/100}Ti_{T/100})O_3$.

A 3/70/30 PLZT is:

$PB_{1-3/100}La_{3/200}(Zr_{70/100}Ti_{30/100})O_3$ which equals $Pb_{0.97}La_{0.03}(Zr_{0.70}Ti_{0.30})O_3$.

Note that in the formula, the total of the Pb and La is 1 as is the total of the Zr and Ti. The sum of the Pb and La is "normalized" to 1, Pb+La=1.

Normally, in the calculations for PLZT sol-gel synthesis, percent by weight is not used.

PLZT family films can be deposited by sputtering or any other technique. The sol-gel method described herein is especially useful.

In the method, a solution of precursors is made containing lead, zirconium, titanium and lanthanum in the desired final film amounts. These solutions may be made from commercially available precursors such as lead tetra-ethylhexanoate, zirconium acetylacetonate, titanium tetrabutoxide, titanium isopropoxide, lead isopropoxide, zirconium tetrabutoxide, lanthanum 2,4 pentanedianoate and other acetates and alkoxides which are capable of forming organometallic polymer gels can be utilized. In many instances, the lanthanum precursor can be lanthanum itself, because it is present in such small amounts that it can be effectively mixed without the need for it to be in the form of an acetate or alkoxide precursor. In general, it is desirable for the organic functional group of the precursor be selected such that it has a molecular weight of less than about 80 grams per mole. As the size of the organic functional group increases, it is more likely to cause defects, such as cracks, in the final film when the organics are volatized. Lead tetra-ethylhexanoate is a less desirable precursor because the large organic group is more likely to result in defects in the final film. The preferred organic functional groups are methanol, butanol, ethanol, acetate and propanol. An important feature of the present invention is the achieving of a homogeneous gel in which the metals, such as lead, lanthanum, zirconium and titanium in a PLZT family film, are uniformly distributed throughout the polymer structure of the gel which will then result in the homogeneous distribution of these metals in the crystal lattice of the final inorganic material.

This homogeneous mixing is obtained by the utilization of precursors soluble in different solvents. While there may be some solubility of the various precursors in solvents for the other precursors, the solubility is generally so small in comparison to the primary solvent as to not be significant. The dissolved precursors are then combined in a mixture. In order to obtain a solution, it may be necessary to heat and agitate one or more of the precursors and the final mix of all the precursors and solvents. Certain of the precursors can be solubilized together then added to the other precursors, for example, the alkoxide precursors can be dissolved in a solution which is a mixture of both their respective solvents and then added to a solution of acetate precursors.

The amount of solvent utilized for each precursor is determined by the amount of solvent necessary such that the hydrolysis reaction rate of each metal precursor is approximately the same as determined by LeChatelier's principle. The amount of solvent for each can be determined by determining the rate of the hydrolysis reaction for each single precursor. Many of these reaction rates are reported in the literature or they can be determined by known experimental techniques. The amount of solvent used for each is then portioned such that the rate of reaction for each precursor is approximately equal. For example, if the reaction ratio of one of the precursors is three times faster than the others which are approximately equal, then three times as much solvent is used for the faster reacting precursor. Thus, when all are combined, the reaction rates are approximately equal. The hydrolysis reaction rates of the various precursors may be altered when the precursors are combined with the other solvents and other precursors. If this occurs, the portions are adjusted accordingly. The initial quantities of solvents should be proportional and sufficient to completely dissolve the precursor for which it is used. The precursors and solvents are agitated, with heat if necessary, to form a homogeneous solution. In general, the formation of a homogeneous solution is indicated by the solution becoming clear from a cloudy condition. Clear does not mean that the solution is colorless, but rather that it is transparent, which indicates that the materials are distributed homogeneously and not merely suspended by mechanical or thermal agitation. Thereafter, a small amount of water is added to promote hydrolysis of the dissolved metal precursors. A complete hydrolysis reaction is not desired and should be avoided because that would result in the precipitation of the product as a solid and prevent its application as a homogeneous gel. In general, an amount of water between about 1 to 4 moles computed on a molar basis of the zirconium and titanium precursors has been found useful. The hydrolysis reaction is shown below:

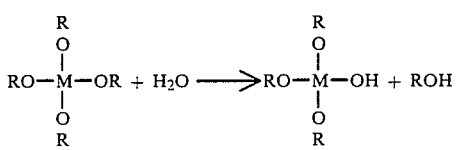

where M is a metal and OR is an alcohol functional group and ROH is an alcohol. And for acetate precursors, the reaction is exemplified as:

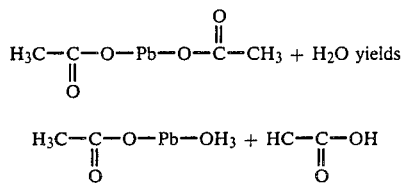

The hydrolysis reaction is quenched (slowed or halted) by the dilution of the mix with additional solvent, preferably added in the same ratios as used previously. A five fold dilution has been found sufficient. Alternatively, the hydrolysis reaction may be quenched by the rapid cooling of the solution, with or without dilution. Quenching by cooling of the solution is less desired because it is more difficult to control.

Thereafter, heat is applied to drive off the azeotrope water and solvents and to initiate a condensation reaction which then forms the organometallic gels as exemplified above. The result is to form a gel which is a group of organometallic polymers having a homogeneous distribution of the metal atoms throughout the polymers. The boiling process is continued until a gel is obtained having the desired viscosity for application of the gel in a thin film to a substrate, such as a silicon or gallium arsenide wafer as commonly used in the semiconductor industry, by spin coating techniques. Useful viscosity for these metal organic gels has been found to be in the range of about 1 to 5 centipose, and preferably from 1 to 3 centipose.

It is desirable that this dissolving of the precursors and the boiling off of the solvents be done in an extremely dry atmosphere and preferably an inert atmosphere. This prevents the absorption of water vapors from the atmosphere which could result in the hydrolysis reaction proceeding too far and causing the precipitation of solids which is undesirable. One advantage of the present invention is that the formed gel can be stored under a dry or inert atmosphere for an extended period of time and can thus accommodate variations in demand and in production schedules.

The gel is applied to suitable substrates such as silicon wafers which have undergone preliminary processing for fabricating integrated circuit elements and which may have a patterned platinum electrode for receiving the PLZT family film. Spin application techniques of gels with viscosities from 1 to 5 centipose usually produce a thin green film of the gel between about 750 to about 1500 Angstroms in thickness. The green film is then oxidized to form the final sintered PLZT ceramic which has a homogeneous distribution of the lead, lanthanum, zirconium and titanium as was present in the gel applied. The formed sintered film of PLZT, PZT or PLT is normally about a third of the thickness of the gel film applied or from about 250 Angstroms to 500 Angstroms. Thicker sintered films can be formed on the substrate by applying multiple layers. For example, a first layer can be applied, sintered and then a second layer applied over the first and sintered.

More than one green film can be applied to a substrate without the need to sinter the previously applied green film. Green film means the sol-gel film as spun before any heating, baking or firing. The green film thus still contains organics, and the coating is an organometallic polymeric gel. One method involves applying a thin green film of the sol-gel to the substrate, thereafter drying the green film by boiling off most of the solvents. This can be done by heating the substrate with applied green film to a temperature above the boiling point of the solvents, preferably heating in a range from 350° C. to about 450° C. for about 2 to 5 minutes. This produces a baked or dried film in which most of the organometallic gel has been decomposed or oxidized, thereby volatilizing most of organics, leaving the inorganics. Thereafter, the subsequent layer(s) of sol-gel green film is (are) applied and baked until the desired thickness of green film is achieved. The baked film, which is unsintered, can be etched by the method of the present invention. The baked film can be sintered before or after etching.

After the sol-gel is applied to the substrate, the green thin film or multiple layers of green film are baked and oxidized to form the final sintered PLZT family ceramic, such as PLZT, PZT or PLT ceramic. As used herein, "sintered" or "fired" film means one which has been heated sufficiently to crystallize the inorganic film. Preferably, the oxidation is conducted in an oxygen enriched atmosphere. Temperatures in the range of between about 475° C. and about 700° C. are used to sinter and preferably 500° C. to 650° C., and most preferably 550° to 650° C.

The green films applied generally are about 750 to about 1500 Angstroms thick. After the green films are baked, the baked film is generally about 275 to about 550 Angstroms thick. After the baked film is sintered, the sintered film is about 250 Angstroms to about 500 Angstroms thick.

It is desirable to utilize solvents which evolve below 350° C. Also, it is desirable to ramp through the temperature range of 350° C. to about 450° C. in a minimum amount of time, because within this temperature a pyrochlore phase of the PLZT forms.

In a preferred sol-gel method, the lead precursor is lead (IV) acetate, the zirconium precursor is zirconium N-butoxide butanol complex, the titanium precursor is titanium (IV) isopropoxide and the lanthanum precursor is lanthanum 2,4-pentanedionate. These precursors are weighed out in amounts necessary to provide the desired amounts of lead, lanthanum, zirconium and titanium in the final PLZT thin film to be made. The lead tetraacetate is commercially available from Morton Thiokol, Inc., Alfa Products, 152 Andover Street, Danvers, Mass., sold under the designation 57113. It is important that the lead (IV) acetate be opened under an inert atmosphere such as argon or nitrogen. If opened in an air environment, the tetraacetate will evaporate and the lead will oxidize and precipitate. This of course is not desirable since the oxidized lead will not be soluble. The lead (IV) acetate is dissolved in a suitable acid such as glacial acetic acid at a temperature in the range from 70° C. to 90° C. The amount of glacial acetic acid added is the amount necessary to dissolve the lead tetraacetate and to give a hydrolysis reaction rate for the lead which is about equivalent to the hydrolysis rate for the other metal precursors in their solvents in the subsequent hydrolysis step.

Next, a zirconium tetrabutoxide and titanium isopropoxide are dissolved, either separately in their respective solvents or in a combined n-butanol and isopropanol. Zirconium tetrabutoxide is commercially available from Alfa products under the designation 88718 and titanium (IV) isopropoxide is commercially available from Alfa products under the designation 77115. The zirconium tetrabutoxide is dissolved in butyl alcohol such as n-butanol. The titanium isopropoxide is dissolved in isopropanol. It is possible to make a mixture of the n-butanol and the isopropanol and add the titanium isopropoxide and the zirconium tetrabutoxide to that solution. Again, the solvents are added in amounts sufficient to dissolve the precursors and to give approximately equal reaction rates during the hydrolysis reaction of the precursors. Lanthanum 2,4-pentanedionate, commercially available from Alfa Products under the designation 89859, because it is present in small amounts, can be dissolved in the mixture of the zirconium precursor and titanium precursor and their solvents.

The steps required to determine the respective concentrations of solvents is to first determine which precursor requires the greatest portion of solvent on a per unit basis of the precursor to be dissolved. From this the hydrolysis rate for that precursor and solvent is determined. From this rate the amounts of solvent necessary for the other precursors can be determined. This procedure assures that there is sufficient solvent to dissolve each precursor while achieving approximately equal reaction rates for the hydrolysis reaction.

The zirconium precursor and solvent, titanium precursor and solvent and lanthanum precursor and solvent are added to the lead tetraacetate and acetic acid solution while maintaining heat and agitation of the solution.

After the homogeneous mixture is obtained for the solutions, deionized water is added in amounts from about 1 to about 4 moles based upon total moles of zirconium and titanium to partially hydrolyze the precursors during this phase. Heat and agitation are maintained until the clear solution becomes colorless.

The hydrolysis reaction is quenched by the dilution of the mixtures with additional solvent. It is generally preferably that the dilution is done using a mixture of additional solvents in approximately the same ratios as used previously. However, it has been found dilution with one or more of the solvents can be effective. Doubling the volume has been found effective for this purpose. The solution is then heated in order to boil it down to about 40% of volume before dilution, which produces a material that is a clear amber solution with a viscosity in the range of about 1 to 5 centiposes, which is appropriate for spin coating. The resulting gel from the boiling produces organometallic polymers with the metal atoms homogeneously mixed throughout the polymer gel. The solubilizing steps and gelling steps should be done in a dry atmosphere or an inert atmosphere to control and predict the hydrolysis reaction, such that the precipitation of solid oxides is prevented.

The resulting gel is then applied to a suitable substrate, such as a silicon wafer. This is done by known techniques in the semiconductor industry. For example, a silicon wafer is centered on a vacuum chuck and cleaned by flooding with isopropanol or distillate from the sol-gel synthesis and spun dry at high speed. A small amount of the PLZT family gel previously produced, for example, about 10 microliter per centimeter squared of area is placed on the center of the substrate. The spinner is accelerated to an RPM chosen to give an even coat of the desired thickness. This is a function primarily of viscosity and specific gravity of the PLZT family gel and flow characteristics of that gel upon the particular substrate substance. Thereafter, the coated substrate is placed in a tube furnace which is commonly known as a diffusion furnace common in the semiconductor industry, for the volatilization of solvent from the gel and the sintering and annealing of the gel to the final PLZT family thin film.

The sintering and annealing step involves a ramp up of the temperature to the desired maximum temperature. The ramp rate is selected such that sufficient time is allowed for volatilization of decomposed organics without destroying the integrity of the coating. Too rapid a heating can cause bubbles which are deleterious or destructive to the coating.

The sintering and annealing step requires the temperature to be at the desired maximum temperature, usually in the range of from 475° C. to about 700° C. and preferably from 550° C. to 650° C., and a dwell time at the maximum temperature to produce the preferred Perovskite crystalline structure for the PLZT family film. After sufficient dwell time at the maximum temperature to completely form the sintered PLZT family thin film ceramic, the finished product is then ramped down in temperature and removed from the furnace.

Other methods known in the semiconductor industry can be used for applying the thin film to the substrate, such as spray or dip coating.

EXAMPLE OF PREPARING A PLZT FILM

PLZT, 8/40/60 plus 10% excess lead:

The beginning point is calculation of the stoichiometry of the desired composition expressed as the L/Z/T ratio. The formula weight for each precursor and a number that determines batch size are factored in. The product of the, L/Z/T ratio number and the batch size factor equals the moles of element or precursor. Two additional factors are used in calculating the amount of Pb precursor: first, the % of excess Pb, and second, a correction of the quantity of solvent in the Pb precursor. An example of our calculations follows (using an 8/40/60 PLZT with 10% excess Pb). The Pb, La, Zr and Ti precursors are commercially available from:

Morton Thiokol, Inc.
Alfa Products
152 Andover Street
Danvers, MA 01923 Alfa Catalog:

---

Alfa Catalog:
\# 57113 Lead(IV) acetate, (10% acetic acid); 90%
Formula Weight (F.W.) 443.37
\# 89859 Lanthanum 2,4-pentanedionate; F.W. 436.24
\# 88718 Zirconium n-butoxide butanol complex;
F.W. 457.81
\# 77115 Titanium(IV) isopropoxide; F.W. 284.25
\# 302506 Acetic acid, Glacial
\# 11632 1-butanol
\# 19397 Isopropanol
The calculation for PLZT, 8/40/64 plus 10% excess Pb, is as follows:
Pb Precursor calculation:

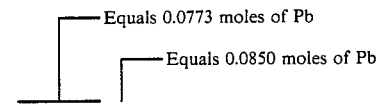
Equals 0.0773 moles of Pb
Equals 0.0850 moles of Pb

-continued

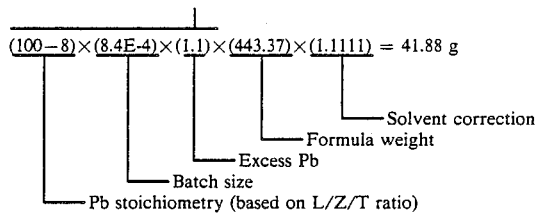

La precursor calculation:

$$\underset{\text{Equals 0.0067 moles of La}}{(8) \times (8.4E-4) \times (436.24)} = 2.93 \text{ g}$$

Zr precursor calculation:

$$\underset{\text{Equals 0.0336 moles of Zr}}{(40) \times (8.4E-4) \times (457.81)} = 15.38 \text{ g}$$

Ti precursor calculation:

$$\underset{\text{Equals 0.0504 moles of Ti}}{(60) \times (8.4E-4) \times (284.25)} = 14.33 \text{ g}$$

Note that: (0.0773 mol Pb + 0.0067 mol La) = (0.0336 mol Zr + 0.0504 mol Ti)
Acetic acid (solvent for Pb precursor) = 10 ml/gram of Pb precursor* (41.88)×(10)
= 418.8 ml
1-Butanol (solvent for Zr precursor) = 4000 ml/mol of Zr* (4000)×(40)×(8.4E-4)
= 134.4 ml
Isopropanol (solvent for Ti precursor) = 4000 ml/mole of Ti* (4000)×(60)×(8.4E-4) = 201.6 ml
Deionized water = 4 moles/mole of Zr + Ti
(4)×((40+60)×(8.4E-4))×(18) = 6.05 g (water is actually measured volumetrically with density equal to 1.0)
*Determined emperically.
*Lead is adjusted to account for excess lead and the amount of acetic acid in commercially packaged lead (IV) acetate (10%).

It has been found that the sum of the calculated quantities without regard for the units involved (grams or milliliters) is a good approximation (within one percent or so) of the volume obtained when these materials are in solution.
41.9+418.8+2.9+15.4+14.3+134.4+201.6+6.]=835.4

835.4 ml is therefore the volume of a 50:50 mixture of 1-butanol and isopropanol required to double the solution volume, thus quenching the reaction prior to boiling back to final volume.

The zirconium n-butoxide butanol complex was dissolved in the n-butanol and combined with the titanium solution (titanium isopropoxide dissolved in isopropanol). The lanthanum 2,4-pentanedionate was dissolved in the solution of titanium and zirconium. In a separate vessel, the lead (IV) acetate was dissolved in the glacial acetic acid under an inert atmosphere while agitating and heating it in a temperature in the range of 70° to 90° C. The solution containing the zirconium, lanthanum and titanium was added to the lead solution while maintaining heat and agitation. The deionized water was then added. The amounts above produced a solution with a volume of 835 ml.

This volume was then doubled by the addition of 835 ml of a mixture in a ratio of 1:1 by volume of n-butanol and isopropanol, resulting in a total volume of 1670 ml. This was then boiled back to a volume of 334 ml or approximately 20% of the starting solution. Viscosity of the finished sol-gel is measured at room temperature with a falling ball viscometer (Gilmont #1 with stainless steel ball); density is determined by weighing an accurately measured volume (25 ml using a volumetric pipet) of sol-gel on an analytical balance. A sol-gel with a viscosity of about 1.4 cp resulted. The prepared sol-gel was spun onto a silicon substrate of 100 mm in diameter at approximately 2000 rpm to produce a sol-gel PLZT layer of about 1500 Angstroms in thickness. This was then heated in a furnace from 549° C. to 551° C. at a ramp in of 100° C. per minute to a temperature of 550° C. where it was held for about 15 minutes to form the Perovskite PLZT. Subsequently, the PLZT substrate was returned to room temperature by ramping it down at a rate of 100° C. per minute.

ETCHING PROCESS

Once the PLZT thin film is formed upon a substrate, a photosensitive material is spun onto the PLZT family ceramic film. Suitable photosensitive materials include any of those used in the art. A mask pattern is transferred to the photosensitive material using photolithographic methods and techniques. Photosensitive materials and the photolithographic techniques for masking are known in the semi-conductor art.

It has been found desirable to etch both an unsintered PLZT family film and to also etch the sintered PLZT family film. This has been found desirable because, in the typical construction of a circuit, the substrate, such as a silicon wafer, is coated with a titanium, platinum or other electrode layer which provides circuit leads. Typically, the platinum coating to which the PLZT family film is to be applied does not cover the entire surface of the silicon substrate. Spin coating or sputtering techniques to apply the thin film from the PLZT family generally cover the entire substrate. It has been found desirable in the initial etch to remove the unsintered PLZT family film from substantially all those areas of the substrate not covered with the electrode layer. This prevents undesirable reaction of the unsintered PLZT family layer with the exposed substrate material when it is fired, resulting in a higher quality final product and also provides for better control of the final etch of the sintered film, as well as, minimizing the area of sintered film to be etched.

Thus, the etching of the unsintered PLZT family film to remove the film from undesired locations of the wafer is beneficial. After the etching step, the photoresist layer is removed from the unsintered PLZT family film. Then the film can be sintered to achieve the desired crystalline structure. After the sintered crystalline structure is achieved, the film can then be masked with the desired pattern and etched again to provide the desired circuitry. In some instances it can be possible to achieve the desired patterning simply from the etch of the unsintered PLZT family layer. Typically, however, the etch of the sintered film is highly desirable.

The etching solution of dilute hydrochloric acid and fluoride ion donor may be any dilute solution. Hydrofluoric ion donor is used generally to refer to either hydrofluoric acid, (HF), ammoniuum fluoride (NH4F) or a combination of the two. Any other fluoride ion donor effective to achieve etching may be used The solution of hydrochloric acid and fluoride ion donor is preferably of a concentration effective to etch the applied thin film in 2 to 15 seconds. Preferably, the fluoride ion donor is a combination of HF and NH4F. The most preferred hydrofluoric ion donor is BOE hydrofluoric acid. In general, if BOE hydrofluoric acid described in the detailed description is replaced by hydrofluoric acid alone, the HF concentration must be increased by adding about 3 parts HF for each part of NH₄F removed to achieve the same etch rate. The etching solution should be performed between 2 to 15 seconds to allow for control of the process while not requiring too long a time to achieve desirable production rate and good quality. Shorter or longer etching times are useful but less desired. Generally, etching should be completed in 15 minutes.

The process for etching an unsintered film of the PLZT family is as follows: First, the unsintered film is applied in the desired thickness to a suitable substrate upon which has previously been deposited an electrode pad in the desired configuration. Thereafter, the unsintered PLZT family layer is covered with a photoresist material which is masked in the desired configuration, usually such that the protected area of the unsintered PLZT film closely corresponds with the electrode pad deposited on the substrate. The photoresist layer is processed to provide a protective coating over that portion of the unsintered PLZT film. The unsintered PLZT film can be applied by any technique when such technique is a sol-gel technique. The green film, should be baked to remove solvents prior to etching.

After the protective photoresist layer has been formed over the unsintered PLZT family film the substrate is then immersed in a first etching bath to remove substantially all of the PLZT family layer not covered by the protective photoresist. The etching bath for the green film is preferably an aqueous solution of hydrochloric and BOE hydrofluoric acid; however, it is possible to use other dilutants for the hydrochloric and BOE hydrofluoric acid, such as glycerol. The composition of the etching bath is preferably about 96% to 99% water with the remainder being hydrochloric and BOE hydrofluoric acid, with the ratio of hydrochloric acid to BOE hydrofluoric acid being in the range of about 1:1 to about 10:1 and preferably 2:1 to 5:1. The water utilized in all the etching baths and for rinsing and the processes of the present invention is preferably deionized or distilled water to minimize possible contamination of the circuit to be formed. The green PLZT film is left in the bath for a sufficient period of time to substantially remove all the green PLZT family film not protected by the photoresist material. For a green PLZT composition of 46 atomic percent Pb, 4 atomic % La, 20 atomic percent Zr and 30 atomic percent Ti, (8/40/60) where said composition is about 0.45 microns in thickness, an etching time of about 8 to 12 seconds was found sufficient when using an etching composition of 40 parts deionized water, and 1 part of a 2:1 solution of hydrochloric to BOE hydrofluoric acid.

After the first etching bath, the substrate is removed and rinsed with water or other suitable material. The substrate can then be placed in a second etching bath of a dilute lead solubilizing compound, such as a dilute nitric acid solution. A dilute nitric acid solution of 10% or less and preferably about 1% nitric acid is used. This removes any residue left from the first etching bath. Normally, the second etching bath is utilized. However, for certain compositions, the process may be optional as the etching step conducted after the sintering process may be sufficient to remove the residue. An etching time of 5 to 10 seconds has been found suitable.

The photoresist mask is stripped from the top of the remaining unsintered PLZT family film and the film is sintered. Thereafter the sintered PLZT family film is covered with a photoresist mask of the desired pattern.

The sintered PLZT family thin film with overlying photoresist is immersed in the initial etching solution. The initial etching solution is an aqueous solution of hydrochloric acid and fluoride ion donor. While separate etching processes utilizing separate aqueous solutions of chloride ion donor and hydrofluoride ion donor can be used, it has been discovered that the combination of hydrofluorde ion donor and hydrochloric acid in the same solution unexpectedly produces superior results than if those acids are used in separate baths.

Use of hydrochloric acid alone leaves a lot of residue. Removal of the residue without undercutting the pattern is quite difficult. Use of fluoride ion donor alone provides too rapid to be controlled and to achieve suitable pattern integrity. The mixture of HCl and fluoride ion donor gives superior characteristics, produces a sharp delineated etch, has a controllable etch rate, and minimizes residue. In this initial etching bath, substantially all of the sintered PLZT family thin film which is not protected by the overlying photoresist pattern is removed. Etching time, however, must be controlled to limit the removal of the sintered PLZT family thin film protected by the overlying photoresist as a result of the etching solution undercutting at the edges of the sintered PLZT family layer. Preferably, this initial etching bath is an aqueous solution of about 45 to about 99% water by volume, with the remainder being 70% hydrochloric acid solution and BOE hydrofluoric acid in a ratio of 70% hydrochloric to BOE hydrofluoric acid in the range of from 1:1 to 10:1 and preferably about 2:1 to about 5:1. Preferably the initial aqueous etching solution is from about 50 to about 75% water by volume and the remainder being the mixture of 70% hydrofluoric acid and BOE hydrochloric acid with the ratio of hydrochloric to hydrofluoric acid being in the range of about 2:1 to about 5:1. In the most preferred embodiment, the initial etching bath contains water in the amount of from about 50 to about 60% and the remainder being hydrochloric and hydrofluoric acids in a ratio of BOE hydrochloric to hydrofluoric acid in the range of 2:1 to 3:1. Thus, in the present invention, the preferred etching solution contains HF buffered with NH₄F in the following ranges:

|  | Preferred | More Preferred | Most Preferred |
|---|---|---|---|
| H₂O | 62% to 99.4% | 67% to 85% | 68.5% to 85% |
| HCl | 0.35% to 35% | 11.5% to 29.5% | 11.6% to 27% |
| HF | 0.01% to 2.2% | 0.33% to 1.3% | 0.4% to 1.3% |
| NH₄F | 0.02% to 9.3% | 1.4% to 5.6% | 2.0% to 5.6% |

The fluoride ion donor can be either HF or NH₄F alone. Either may be substituted for the other. In general, HF may be substituted in the same volume amount as the NH₄F replaced, which will increase the etching rate. To achieve approximately the same etching rate, the NH₄F can be replaced with sufficient HF to provide the same fluorine content, thus, 1 part NH₄F can be replaced with 0.56 parts HF. Similarly, HF may be replaced by NH₄F. Generally, if HF is replaced with equal volumes of NH₄F, the etching rate is slower. To achieve a comparable etch rate, 1 part of HF can be replaced with 1.78 parts NH₄F. The hydrochloric acid and fluorine ion donor etching solution can be from 62% to 99.4% water, 0.35% to 35% HCl and 0.02% to 11.5% HF can be used, or the etching solutions can be from 62% to 99% water, 0.35% to 35% HCl and 0.03% to 14% NH₄F can be used.

The time necessary to etch the unprotected sintered PLZT family varies with the concentration of the etching solution, the thickness of the sintered PLZT family film and amount of exposed film. It has been found that for etching a PLZT sintered film of the composition 46% 4% La, 20% Z and 30% Ti of approximately 0.45 microns in thickness, about 2 to 15 second (preferably 5 to 8) 1s sufficient to achieve a good etch with little undercutting when the etch solution is a 50% aqueous solution of HCl and BOE hydrofluoric acid in a ratio of 2:1. A PLT film generally requires less etching time, and a PZT film slightly longer time.

After the initial etching process is completed, the substrate with patterned sintered PLZT family film is removed from the initial etching bath. The etching process is completed when the sintered PLZT family thin film in areas outside the desired pattern has been substantially removed. This may be determined by taking several samples of the PLZT family film to be etched, and placing them in an etching bath for various periods of time and viewing the resulting etch under a microscope to determine the proper time. The substrate is removed from the initial etching bath before there is significant undercutting of the PLZT layer protected by the overlying photoresist.

After removal from the initial etching bath, the substrate is preferably rinsed with deionized water to remove the initial etching solution. Removal of the initial solution is desirable to prevent further undercutting by residual etching solution clinging to the edges of the sintered PLZT family film underneath the photoresist pattern. It was found that sintered PLZT family thin film which had been etched by this initial bath and was not further processed did not exhibit the desired characteristics as to purity. While Applicants do not wish to be bound to any particular theory, it is believed that these poor characteristics were the result of the initial etching solution failing to remove the lead and that a lead residue remained which affected performance. Thus, it was discovered that a second etching step was highly desirable to provide a resulting patterned PLZT thin film having suitable qualities for semiconductor usage.

After removal from the initial etching bath or after the subsequent rinse if utilized, the sintered PLZT family film, which has been patterned and still has the overlying photoresist pattern in place, is immersed in a second etching bath of a lead solubilizing solution for a sufficient period of time to remove residue from the initial process. It is desirable that this solution be a highly dilute solution because otherwise it tends to undercut too much. Suitable solutions are dilute aqueous nitric acid solutions of about 10% or less nitric acid in aqueous solution, preferably about 1% nitric acid. Dilute acetic acid can be used for many of the films. It has also been found that using a dilute solution of nitric acid in hydrogen peroxide allows for better control of undercutting. Thus a dilute solution of nitric acid in hydrogen peroxide, 10% or less and preferably less than 1%, can be utilized and may be preferred depending on cost of hydrogen peroxide and desired tolerances for the product. Generally, it has been found that for a PLZT film which has been subjected to the first etching process approximately 5 to 10 seconds and about 1% nitric acid solution is sufficient to remove the residue.

After the second etching process is completed, the substrate having the PLZT thin film with overlying photoresist pattern is removed from the second etching bath and rinsed with deionized water. The film is then dried in a suitable manner, such as blow drying with an inert gas, such as nitrogen, which is the preferred method, or spun dry by spinning it at high speed. After drying, the overlying photoresist pattern is removed using known immersion methods in standard chemicals such as the R-10 method. R-10 is the trade designation for a 5.1N solution of diethylene glycol monobutyl ether sold by KTI Chemicals Inc. The removal of the photoresist pattern then reveals the replicated PLZT thin film pattern remaining on the substrate.

The etching solutions of the present invention can also contain a surfactant to provide for better wetting of the film by the etching solutions. Any suitable surfactant may be used, such as, octylphenoxy polyethoxy ethanol sold under the tradename Triton X100.

The following examples illustrate the present invention but are not limiting as to the nature of the invention:

EXAMPLE 1

A silicon wafer of the type commonly used in the semiconductor industry, such as silicon wafers sold by AUREL, of 100 millimeters in diameter and about 20 mils thick, was initially subjected to conventional planar processing to form MOS transistors, which serve as the switching and logic elements of the resulting circuit. This wafer was then coated with a layer of platinum film, which was etched to serve as the bottom electrode of a PLZT circuit element by a process conventionally used in the art. A thin film of sintered PLZT having a composition of approximately 46 atomic % Pb, 4 atomic % La, 20 atomic % Zr and 30 atomic % Ti, was deposited as a thin film upon the patterned platinum on the silicon wafer. The thin layer of PLZT was approximately 4500 Å thick and the silicon wafer was approximately 100 mm in diameter. A photosensitive material sold under the trade designation "Positive Photoresist 1450" by KTI chemicals a conventional novolak/-diacoquinone chemistry familiar to the industry in ethylene glycol mono ethyl ether acetate solvent base was applied over the PLZT film. A mask was then used to selectively expose the photoresist. The exposed photosensitive material was developed using photolithographic methods and techniques common in the art.

Thereafter, the wafer was placed in the initial etching bath which contained an aqueous solution of hydrochloric acid and hydrofluoric acid, having a composition of 50% by volume water, 33.3% of a 70% hydrochloric acid in water and 16.7% of BOE buffer hydrofluoric acid buffered etch containing 7.8% HF, 33.6% ammonium fluoride and the remainder being water. Both the HCl solution and HF buffered oxide solution were commercially available. The PLZT was left in the bath for 10 seconds. The temperature of the bath was approximately 23° C. This process removed substantially all of the exposed PLZT lying underneath the undeveloped photoresist. The PLZT film under the photoresist was left intact as a pattern corresponding to the mask. The patterned, sintered PLZT substrate was then rinsed and placed in the second etching solution containing a dilute hydrogen peroxide solution of nitric acid having a nitric acid content of 1% at a temperature of 23° C. for a period of 5 seconds. The wafer was then removed from the bath, rinsed with deionized water and dried. The resulting substrate was then in condition for further processing to complete the circuit.

EXAMPLE 2

A substrate coated with a sintered PLT layer, approximately 0.45 microns thick and containing 42.5 atomic % lead, 7.5 atomic % lanthanum and 50 atomic % titanium, was masked with a photoresist and immersed in the initial etching bath containing 50% water, 33.3% of a 70% HCl in water solution and 16.7% of a BOE buffered hydrofluoric acid containing 7.8% HF, 33.6% ammonium fluoride in water HF for 8 seconds, removed and rinsed. Thereafter, it was immersed in the second etching bath of approximately a 1% hydro solution of nitric acid for 5 seconds at about 23° C. The resulting PLT layer was then suitable for further processing to complete the circuit.

EXAMPLE 3

A wafer having a sintered PZT layer of approximately 0.45 microns thick, was masked with the desired pattern and placed in an etching bath of 70% HCL solution in water, and 16.7% of BOE buffered hydrofluoric acid containing 7.87% HF and 33.6% NH4F, at a temperature of 23° C. for 12 seconds. The PZT composition was approximately 50 atomic % lead, 25 atomic % zirconium and 25 atomic % titanium. The substrate was removed from the first etching bath, rinsed and then placed in the second etching bath of about 1% $H_2O_2$ solution of nitric acid for 5 seconds at 23° C. The resulting wafer was removed and rinsed and was suitable for further processing to complete the circuit.

EXAMPLE 4

An unsintered PLTZ film was applied to a substrate using sol-gel techniques. The substrate with applied green film was baked to about 400° F. for about 5 minutes to drive off solvents. The resulting baked film was approximately 0.5 microns thick. It was covered with a photomask which was processed to provide the desired pattern and then placed in an etching bath of approximately 40 parts water and 1 part of an aqueous solution of hydrochloric acid containing 70% with a BOE buffered hydrofluoric solution containing 7.8% HF and 33.6 NH4F in the ratio of 2:1 at a temperature of 23° C. for a period of about 10 seconds. The substrate was removed from the first etching bath, rinsed, and inserted in a second etching bath of a nitric acid containing 1% nitric acid and about 31% hydrogen peroxide solution for 5 seconds. Thereafter it was removed and rinsed. The photomask was then removed and the remaining green PLZT layer was sintered to form a ceramic PLZT layer on the substrate.

Thereafter the sintered PLZT layer was covered with a photoresist material, masked with the desired pattern, and processed to provide protective layer corresponding to the desired circuit pattern. The sintered PLZT layer with applied mask was then inserted in a first etching bath of 50% water, 33.3% of a 70% HCl solution, and 16.7% BOE buffered hydrofluoric acid for a period of approximately 10 seconds. It was thereafter removed, rinsed, and placed in a second etching bath of approximately a 1% aqueous solution of nitric acid for about 5 seconds. It was removed from the second etching bath, rinsed and dried and the photoresist layer was removed. The resulting patterned film had good definition and was suitable for further processing to construct a completed circuit.

We claim:

1. A method for etching a sintered film of a composition from the PLZT family of films comprising:
    (a) immersing a substrate which has a processed photoresist mask having a predetermined pattern covering the sintered film of a composition from the PLZT family, in a dilute etching solution containing from about 62% to about 99.4% water by volume and about 0.35% to about 35% by volume hydrochloric acid, and from 0.02% to 14% of a fluorine ion donor by volume, for a period of time sufficient to etch that portion of said sintered film not covered with the patterned photoresist layer for a period of time sufficient to remove substantially all the sintered film not covered by the patterned photoresist material;
    (b) removing said substrate from said dilute solution of hydrochloric acid and fluorine ion donor acid; and
    (c) immersing the substrate from step (b) into a dilute solution of a lead solublizing medium for a sufficient period of time to remove residue remaining after the etching of step (b).

2. The method of claim 1 wherein said fluorine ion donor is selected from the group comprising hydrofluoric acid, ammonium fluoride, and mixtures thereof.

3. The method of claim 1 wherein said dilute solution of lead solubilizing medium is a dilute aqueous solution of 10% or less nitric acid.

4. The method of claim 1 wherein said dilute solution of lead solubilizing medium is a dilute solution of nitric acid in hydrogen peroxide.

5. The method of claim 1 wherein said dilute solution of lead solubilizing medium is a dilute aqueous solution of acetic acid.

6. The method of claim 1 wherein said dilute solution of hydrochloric acid and fluorine ion donor is an aqueous solution containing from about 67 to about 85% water by volume, about 11.5 to 29% hydrochloric acid, from about 1% to 4.5% hydrofluoric acid.

7. The method of claim 1 further comprising the step of rinsing the substrate after step (b) and prior to step (c).

8. The method of claim 2 further comprising the step of rinsing the substrate after step (b) and prior to step (c).

9. The method of claim 3 further comprising the step of rinsing the substrate after step (b) and prior to step (c).

10. The method of claim 4 further comprising the step of rinsing the substrate after step (b) and prior to step (c).

11. The method of claim 5 further comprising the step of rinsing the substrate after step (b) and prior to step (c).

12. The method of claim 6 further comprising the step of rinsing the substrate after step (b) and prior to step (c).

13. The method of claim 1 wherein said dilute solution of fluorine ion donor is from about 67% to about 85% water, 11.5% to 29% hydrochloric acid and from about 2% to about 8% ammonium fluoride.

14. A method for etching a green film of a composition from the PLZT family comprising:
    (a) immersing a substrate which has a processed photoresist mask having a predetermined pattern covering a green thin film of a composition from the PLZT family in a dilute etching solution from about 83% to about 99% water, from about 0.4% to about 15% hydrochloric acid and from about 0.02% to about 12% of a fluorine ion donor, for a period of time sufficient to etch that portion of the said green film not covered with the developed photoresist layer for a period of time sufficient to remove substantially all of the green film not covered by the developed photoresist material;

(b) removing said substrate from said dilute solution of hydrochloric and hydrofluoric acid; and (c) immersing the substrate from step (b) into a dilute solution of a lead solubilizing medium for sufficient period of time to remove residue remaining after the etching of step (b).

15. The method of claim 14 wherein said dilute solution of hydrochloric acid and fluorine ion donor contains from about 96 to 99% water by volume.

16. The method of claim 14 wherein said dilute solution of lead solubilizing medium is a dilute aqueous solution of 10% or less 5% nitric acid.

17. The method of claim 14 wherein said dilute solution of lead solubilizing medium is a dilute solution of nitric acid in hydrogen peroxide.

18. The method of claim 14 wherein said dilute solution of lead solubilizing medium is a dilute aqueous solution of acetic acid.

19. The method of claim 14 wherein said fluorine ion donor is selected from the group comprising hydrofluoric acid, ammonium fluoride or a combination thereof.

20. The method of claim 14 further comprising the step of rinsing the substrate after step (b) and prior to step (c).

21. The method of claim 15 further comprising the step of rinsing the substrate after step (b) and prior to step (c).

22. The method of claim 16 further comprising the step of rinsing the substrate after step (b) and prior to step (c).

23. The method of claim 17 further comprising the step of rinsing the substrate after step (b) and prior to step (c).

24. The method of claim 18 further comprising the step of rinsing the substrate after step (b) and prior to step (c).

25. The method of claim 19 further comprising the step of rinsing the substrate after step (b) and prior to step (c).

* * * * *